Oct. 22, 1929.                 B. E. LENEHAN                    1,732,687
                        REACTIVE VOLT AMPERE METER
                            Filed April 29, 1927
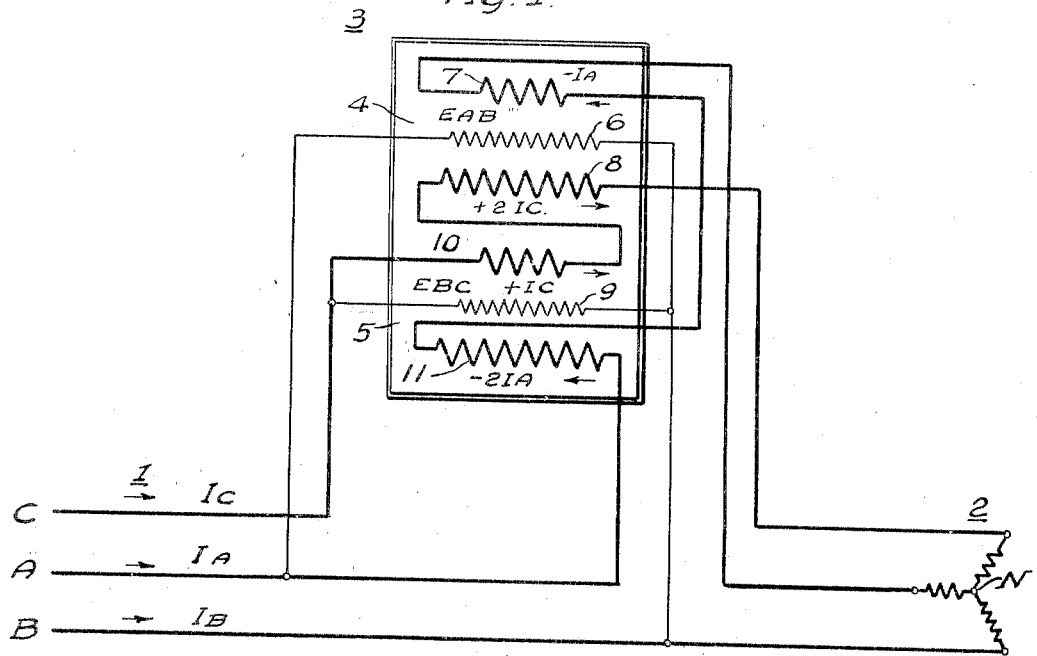
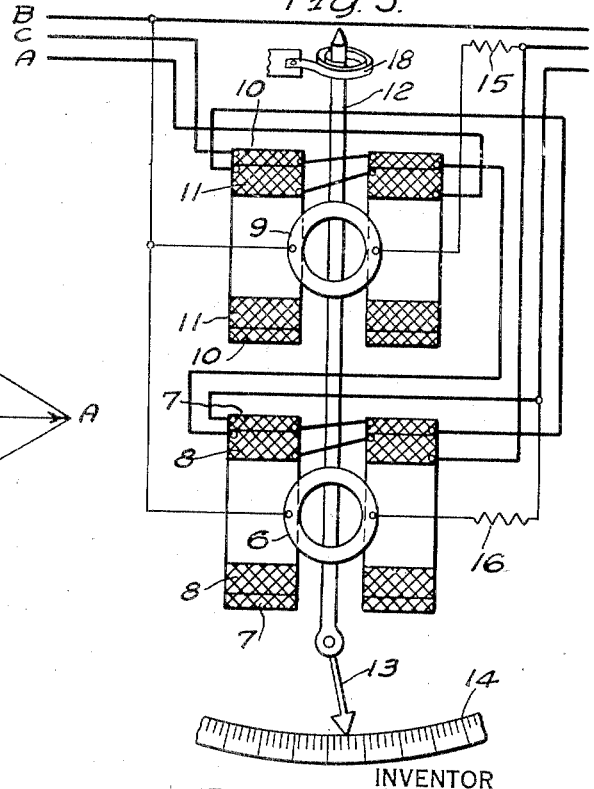
WITNESSES:
E. A. McCloskey
B. R. King
INVENTOR
Bernard E. Lenehan.
BY
Wesley G. Carr
ATTORNEY Patented Oct. 22, 1929

1,732,687

UNITED STATES PATENT OFFICE

BERNARD E. LENEHAN, OF WILKINSBURG, PENNSYLVANIA, ASSIGNOR TO WESTINGHOUSE ELECTRIC & MANUFACTURING COMPANY, A CORPORATION OF PENNSYLVANIA

REACTIVE VOLT-AMPERE METER

Application filed April 29, 1927. Serial No. 187,436.

My invention relates to electrical measuring instruments, and more particularly to means for measuring the reactive volt amperes in a polyphase system of alternating-current circuits.

An object of my invention is to provide an instrument that shall accurately measure the reactive volt amperes traversing a polyphase system.

Another object of my invention is to provide an instrument of the above indicated character that shall operate without the aid of external reactors.

A further object of my invention is to provide a reactive volt ampere meter that shall be compact in construction, economical to manufacture and effective in operation.

A still further object of my invention is to provide an improved method of measuring reactive volt amperes.

My invention is equally applicable to both indicating watt meters and integrating watt-hour meters, although I show a scheme for securing only instantaneous indications of the reactive volt-amperes traversing a polyphase circuit.

Heretofore means have been suggested for measuring the reactive volt amperes of alternating-current circuits, but such means have usually been comparatively complicated in that they require external reactors and more or less complicated wiring systems.

In practicing my invention I provide a device similar to an ordinary watt meter, that is provided with current coils so wound and interconnected that when properly connected to an alternating-current circuit, the instrument measures reactive volt amperes in a simple and expeditious manner.

My invention is applicable to three-phase systems connected in either delta or star. I make use of two actuating elements severally comprising a voltage coil and a doubly-wound current coil. Two armatures on the same shaft, the turning motion of which is opposed by a spring, are adapted to be moved by the co-operating fluxes resulting from the current and the voltage windings.

The voltage coils are connected in the customary way across two phases of the three-phase system. The current coils consist of two sections electrically insulated from each other. One section of each coil is wound to have twice as many turns as the other, or, for the same current passing through each section one will have double the flux strength of the other. The sections of the coils are connected in such manner that the section having more turns on one coil is in series with the section having fewer turns of the other coil, each such system being connected in series circuit relation with a phase of the three-phase system. Both current sections of one element are reversed with respect to the current sections of the other element. So long as the voltages of the system are balanced such a scheme of connections causes the instrument to accurately measure the reactive-volt-amperes even for unbalanced currents.

For a better understanding of my invention reference may be had to the accompanying drawings, in which, Figure 1, is a diagrammatic view of a meter constructed in accordance with my invention applied to a three phase system supplying a star connected load, Fig. 2 is a vector diagram of the system shown in Fig. 1, and Fig. 3 is a schematic view of the device shown in Fig. 1.

Referring now more in detail to the drawings, a three phase system 1 consisting of phases A, B and C is electrically connected to supply a star connected three phase load 2. A wattmeter 3 constructed in accordance with my invention is connected to the system 1 to measure the reactive volt amperes consumed by the load 2.

The wattmeter 3 comprises an upper element 4 and a lower element 5. The upper element 4 includes a voltage coil 6 and a doubly wound current coil consisting of a winding 7 and a winding 8, electrically insulated from each other. The windings 7 and 8 are shown spaced apart above and below the voltage winding diagrammatically for purposes of clearness. Winding 8 is wound to have twice as many ampere turns as winding 7. The lower element 5 of the wattmeter 4 is similar in construction to the upper element 4, consisting of a voltage coil 9 and current windings 10 and 11.

In Fig. 3 the voltage coils 6 and 9 are movable with respect to the current coils of the elements 4 and 5. The voltage coils are mounted on a shaft 12 that has a hand or pointer 13 secured thereto for indicating, on a scale 14, the units of the quantity being measured, in this case watts, the quantity traversing the main circuits A, B and C. The turning motion of the shaft 12 is restrained by a spring 18. The voltage coils are provided with resistors 15 and 16 to limit the current traversing the respective windings 9 and 6.

The currents passing through the upper and lower windings produce fluxes that affect the armature of the meter in opposite directions, as is illustrated by the arrows. So long as the voltage polygon remains balanced the instrument will measure the reactive voltamperes accurately.

Referring to Fig. 2 showing the vector relations of the currents and voltages in the instrument coils, the triangle A B C represents the voltage triangle for the three phases of an electrical system, N being chosen as the neutral point. NA, NB and NC represent the voltages generated in the star phase coils from phase to neutral. For a simplified proof, the currents are shown leading their respective phase voltages as represented by the vectors $I_A$, $I_B$ and $I_C$. In any polyphase system, the vector sum of the currents must equal zero, therefore, $I_A$ and $I_B$ are equal vectorially to $I_C$ as shown in the vector diagram.

The current affecting element 4 is represented by the vector sum of $-I_A$ and $+2I_C$ and this vector sum is shown by the vector $NI_4$. Similarly the current affecting element 5 is represented by the vector sum of $I_C$ and $-2I_A$ which is shown by the vector $NI_5$.

$$\sqrt{3}E[-2I_A \sin \alpha + 2I_C \sin \gamma + I_C \cos(30°+\gamma) - I_A \cos(30°-\alpha)] \quad (3)$$

The angles of lead between the three load currents and their corresponding voltages are represented by $\alpha$, $\beta$ and $\gamma$ respectively.

Element 4 exerts a torque that is proportional to the product of the voltage $E_{AB}$ and the current $(2I_C - I_A)$ by the cosine of the angle between them. But since the effect of the resultant of the currents $2I_C$ and $-I_A$ is the same as the sum of the separate effects of each they will be considered separately for purposes of clearness.

The instrument is caused to indicate reactive-volt-amperes by combining $I_C$ with a voltage perpendicular to $E_{AB}$ and by combining $I_A$ with a voltage perpendicular to $E_{CB}$. The torque actuating element 4 is proportional to the voltage traversing the coil 6 by the current traversing the coils 7 and 8 that are wound so that their fluxes combine. The voltage traversing the winding 6 is equal to $\sqrt{3}$ by the voltage from neutral N to phase A. The flux from coil 8 is proportional to $2I_C$, since it is doubly wound and therefore a torque proportional to $\sqrt{3}E$ by $2I_C$ by the consine of the angle of phase difference between them is exerted between the coil 8 and the coil 6. The angle $\gamma$ between NC and $I_C$ is 90° displaced with respect to AB which represents the phase position of $\sqrt{3}E$ traversing the coil 6.

Therefore the torque exerted between coils 8 and 6 is proportional to the expression $$\sqrt{3}E[2I_C \cos(90°+\gamma)] \quad (a)$$

In the same manner fluxes from coils 7 and 6 cooperate to produce a torque proportional to $$\sqrt{3}E[-I_A \cos(30°-\alpha)] \quad (b)$$

Combining expressions $(a)$ and $(b)$ the torque actuating element 4 is proportional to $$\sqrt{3}E[+2I_C \cos(90°+\gamma) - I_A \cos(30°-\alpha)] \quad (1)$$

Where E is the voltage for any phase from neutral to line and is equal to $E_A$, $E_B$ and $E_C$ for balanced voltage conditions of the polyphase circuit.

The torque actuating element 5 is similarly proportional to:

$$\sqrt{3}E[-2I_A \cos(90°+\alpha) + I_C \cos(30°+\gamma)] \quad (2)$$

Since the movements of both elements are on the same shaft the torque affecting the armature will be equivalent to the sum of expressions 1 and 2 that results in the expression:

which gives the combined effect of the two elements. In a three phase three wire system the vector sum of the three current vectors is zero. Therefore, it follows that the sum of the projections of the current vectors on a reference line is zero. Projecting the current vectors on the voltage vector A B as a reference line gives $$-I_A \cos(30°-\alpha) + I_C \sin \gamma + I_B \cos(30°+\beta) = 0 \quad (4)$$

Similarly projecting the current vectors on the voltage vector CB gives $$-I_A \cos(30°-\alpha) + I_C \sin \gamma + I_B \cos(30°+\beta) = 0 \quad (5)$$

Substituting values of $$I_A \cos(30°-\alpha)$$
$$I_C \cos(30°+\gamma)$$

as determined by equations (4) and (5) in (3) we have $$\sqrt{3}E[2I_A \sin \alpha + 2I_C \sin \gamma - I_A \sin \alpha + I_B \cos(30°-\beta)] - I_C \sin \gamma - I_B \cos(30°+\beta) \quad (6)$$

or $$\sqrt{3}E(I_A \sin \alpha) + I_C \sin \gamma + I_B[\cos(30°-\beta) - \cos(30°+\beta)] \quad (7)$$

Also the expression $$\cos(30°-\beta) - \cos(30°+\beta)$$

reduces to $$\frac{\sqrt{3}}{2}\cos\beta + \frac{1}{2}\sin\beta - \frac{\sqrt{3}}{2}\cos\beta + \frac{1}{2}\sin\beta = \sin\beta$$

therefore expression 7 becomes $$\sqrt{3}E(I_A \sin \alpha + I_B \sin \beta + I_C \sin \gamma)$$

The expression in parenthesis times E is the reactive volt amperes of the circuit and the instrument reads, therefore, the product of the reactive volt amperes of the circuit by the $\sqrt{3}$. The constant represented by the $\sqrt{3}$ is included in the calibration of the instrument so that the latter reads reactive volt amperes directly.

By the application of my invention an ordinary wattmeter or watthour meter may be easily and readily changed into an accurate reactive volt ampere meter. The cost of such a changeover is negligible because no external reactors or extra resistances are required to improve the operation of the device. Quite a saving in the cost of such instruments is accomplished when it is remembered that those instruments depending upon external reactors for their operation are relatively expensive due to the fact that the reactors must be made to an exact reactance in order that the neutral of the system will be in its proper place.

Various changes may be made in the connections without departing from the spirit of my invention.

I claim as my invention:

1. An apparatus for measuring the reactive volt amperes in a three phase system comprising two potential coils connected across different phases of the system, two differentially wound current coils co-operating one with each potential coil, each current coil consisting of two portions electrically insulated from each other, one portion having substantially double the strength of the other portion, the strong portion of one current coil being connected with the weak portion of the other coil in series circuit relation with one phase of the system, and the strong portion of the other current coil being connected with the weak portion of the first current coil in series circuit relation with another phase of the system, and means for utilizing the torques produced by the current and potential coils for producing an indicating function.

2. An apparatus for measuring the reactive volt-amperes in a three-phase system comprising two potential coils, two differentially connected current coils each having two portions one of which is substantially double the strength of the other, the strong portion of each current coil being connected with the weak portion of the other current coil, the two current coils co-operating one with each potential coil, and means for utilizing the torques produced by the current and potential coils for performing an indicating function.

3. A meter comprising a plurality of co-acting relatively movable flux producing elements, each of said elements severally comprising a coil energized in accordance with voltage and a plurality of coils energized in accordance with current, said current coils being differentially wound and of different flux producing ability, a three-phase current transmitting system, means for connecting the voltage coils between the phases of said system, and for each element means connecting the low-flux current coil of one element and the high-flux current coil of another element in series circuit relation with one of the phases of said system.

4. A measuring instrument comprising two meters severally consisting of two separate differentially wound current coils having ampere-turn ratios of substantially two to one and a voltage coil coacting therewith, and in both meters means connecting the high-ampere-turn current coil of one meter in series-circuit relation with the low-ampere-turn current coil of the other meter.

5. A measuring instrument comprising two meters severally consisting of two separate differentially wound current coils having ampere-turn ratios of substantially two to one and a voltage coil coacting therewith, said current coils being fixed relative to each other and said voltage coils also being fixed relative to each other but relatively movable with respect to said current coils, and in both meters means connecting the high-ampere-turn current coil of one meter in series-circuit relation with the low-ampere-turn current coil of the other meter.

6. In combination, a three-phase three-wire electric system, a measuring instrument for said system comprising two meters each of which has two differentially wound current coils having an ampere-turn ratio of two to one and a voltage coil coacting therewith, means connecting one of said voltage coils between two of said wires, means connecting the other of said voltage coils between one of said two wires and the third wire, and in both meters means severally connecting said low-ampere-turn coil of one meter in series-circuit relation with said high-ampere-turn coil of the other meter and means for energizing each of said current-coil series circuits in accordance with the current traversing one of the phases of said system.

7. A measuring instrument for a three-phase circuit, comprising two meter elements for driving armatures connected to the same shaft, each of said meter elements comprising two current coils and each of said armatures comprising a voltage coil connected between different phases of said circuit, said current coils in each of said meter elements being differentially wound and having an ampere-turn ratio of two to one, the low-ampere-turn coil of one meter being connected in series-circuit relation with the high-ampere-turn coil of the other meter and means for energizing each of said current-coil circuits in accordance with the current traversing one of the phases of said circuit.

8. A measuring instrument comprising a plurality of meters having their armatures connected together, said meters severally consisting of two separate differentially wound coils having ampere-turn ratios of substantially two to one and a third coil coacting therewith, and in said meters means connecting the high-ampere-turn coil of one meter in series-circuit relation with the low-ampere-turn coil of the other meter.

In testimony whereof, I have hereunto subscribed my name this 26th day of April, 1927.

BERNARD E. LENEHAN.